United States Patent Office 3,459,590
Patented Aug. 5, 1969

3,459,590
PROCESS FOR MODIFYING THE SURFACES OF SHAPED SYNTHETIC FIBRE-FORMING POLYMER ARTICLES WITH COPOLYMER CONTAINING POLYOXY ALKYLENE SEGMENTS HINDERED PHENOL ANTIOXIDANT AND PEROXIDE DECOMPOSER
William Michael Corbett and David Harrison, Harrogate, England, assignors to Imperial Chemical Industries Limited, London, England, a corporation of Great Britain
No Drawing. Filed Jan. 10, 1966, Ser. No. 519,471
Claims priority, application Great Britain, Jan. 19, 1965, 2,337/65
Int. Cl. B44d 1/22; C08j 1/00; B32b 5/00
U.S. Cl. 117—138.8       11 Claims

ABSTRACT OF THE DISCLOSURE

A process for modifying a shaped synthetic fibre-forming polymer article comprising padding onto the article a dispersion or solution of a copolymer containing repeat units identical with those constituting the crystalline segments of the polymer and also polyoxyalkylene segments which confer hydrophilic properties on the article, to which is added 0.05–5%, preferably 0.2–1.0%, by weight, based on the weight of said copolymer, of a hindered phenol antioxidant together with 0.005 to 5.0%, preferably 0.1–1.0%, by weight, also based on the weight of the said copolymer, of a peroxide decomposer selected from at least one of the following groups: thiophosphate, thiophosphite, and a xanthate.

DISCLOSURE

This invention relates to modified fibre-forming polymers.

More particularly this invention relates to fibre-forming polymers which are hydrophobic and as a result have a propensity to acquire charges of static electricity. Proposals have therefore been made to overcome these disadvantages by incorporating into the polymer before the shaping operation which includes meltspinning, any constituent which would make the polymer less hydrophobic. Other attempts comprise treating the shaped polymer with various agents which may result in for example amidation, sulphation or phosphation at least on the surface of the shaped polymer articles. When this is done the mechanical and physical properties of the shaped polymer articles are usually adversely affected before an appreciable reduction in hydrophobicity is achieved.

In U.S. Patent 3,416,952 is described a novel method of modifying the surface of shaped polyesters in order to make them hydrophilic and also to decrease their propensity to acquire an electrostatic charge. The effect, which is durable to prolonged washing under normal domestic conditions, is obtained by treating the shaped article with a copolymer containing repeat units identical with those constituting the crystalline segments of the polyester and also active groups which confer the hydrophilic properties. A most effective copolymer is one which contains polyoxyalkylene segments as the active group.

The surface treatment of further shaped articles has been described i.e., from polyacrylonitrile and in U.S. application of McIntyre Ser. No. 454,187, filed May 7, 1965, polyamides, with copolymers containing polyoxyethylene segments and also the relevant repeat units identical with those of the polymer to be treated.

One effective way by which shaped articles may be surface-modified according to the above described patents is to pad onto the articles a solution or dispersion of the relevant copolymer followed by heating the padded articles at temperatures above 90° C. Whilst the application of the copolymers to shaped articles, particularly fibres, fabrics, and films, by this method produces a very desirable effect, articles which are optically brightened, either before or during the application of the copolymer, suffer from a dulling of the optical brightener. This effect is believed to be due to the polyoxyalkylene segments of the copolymer decomposing at temperatures above 90° C. to give rise to peroxides which then react with the optical brightener, thereby reducing its effectiveness. Optical brighteners based upon benzoxazolylethylene (e.g. 1,2-bis-(6'-methylbenzoxazol-2'-yl)-ethylene), benzoxazolythiophene (e.g. 2,5-bis-(tertbutylbenzoxazol-2'-yl)-thiophene), stilbene (e.g. 2-cyano-4-naphthatriazol-2''-yl-4'-chlorostilbene), and phenylcoumarin (e.g. 3'-methylpyrazol-1'-yl-3-phenylcoumarin) are dulled by the thermal degradation products of polyoxyethylene glycol.

We have now shown that the dulling of the optical brightener may be considerably reduced by the stabilisation of the copolymer with a mixture of a phenolic antioxidant and a peroxide decomposer.

According to our invention therefore, we provide a process for modifying a shaped synthetic fibre-forming polymer article comprising padding onto the article a dispersion or solution of a copolymer containing repeat units identical with those constituting the crystalline segments of the polymer and also polyoxyalkylene segments which confer hydrophilic properties on the article, to which is added 0.05%–5%, preferably 0.2–1.0%, by weight, based on the weight of said copolymer, of a hindered phenol antioxidant together with 0.005 to 5.0%, preferably 0.1–1.0%, by weight, also based on the weight of the said copolymer, of a peroxide decomposer selected from at least one of the following groups: thiophosphate, thiophosphite, and a xanthate. Suitable peroxide decomposers are thiophosphates having the formula:

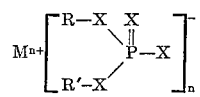

where:

X is oxygen or sulphur, at least one $x$ being sulphur
R,R' are the same or different and are alkyl radicals having 2 to 20 carbon atoms, aryl, aralkyl, or cycloalkyl radicals.
M is a metal ion of valency $n$ selected from Group I or Group II of the periodic table or from chromium, manganese, iron, cobalt, or nickel.

Particularly suitable compounds are the zinc salts of dialkyldithiophosphoric acid, the alkyl groups having from 2 to 10 carbon atoms, especially zinc di-isopropyl-dithiophosphate.

Suitable thiophosphites have the formula

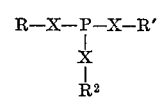

where:

X is oxygen or sulphur, at least one X being sulphur
R, $R^1$ and $R^2$ being the same or different and are alkyl radicals having 2–20 carbon atoms, aryl, aralkyl or cycloalkyl radicals Particularly useful are the trithiophosphites where R, $R^1$, and $R^2$ are the same and are phenyl radicals, or alkyl radicals having from 2 to 20 carbon atoms. Especially useful is tridodecyltrithiophosphite.

Suitable xanthates have the formula

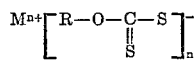

where:

M is a metal ion of valency $n$
R is an alkyl, aryl, aralkyl, or cycloalkyl radical.

It is expedient to dissolve the phenolic antioxidant and also the peroxide decomposer in a solvent prior to dispersing in the aqueous copolymer dispersion. Suitable solvents include the ethylene oxide condensates, particularly the condensates with alcohols or phenols, the condensate of 6–12 moles of ethylene oxide with 1 mole of nonylphenol being particularly useful. It is desirable to keep the amount of solvent to a minimum, and solutions containing from 10–50% by weight of each antioxidant component are ideal. The antioxidant components may be added as separate solutions or they may be dissolved together in the same solvent.

When a metal salt of thiophosphoric acid or xanthic acid is used as the peroxide decomposer, it is useful to employ a second solvent. Solvents such as chloroform, dioxan, ethyl acetate or the dimethylether of ethylene glycol may be used, but dimethylformamide and dimethylsulphoxide are more effective. Again the concentration of the solvent should be kept to a minimum. A particularly effective antioxidant composition consists of 24 parts of zinc di-isopropyldithiophosphate dissolved in 16 parts of dimethylsulphoxide to which is then added 24 parts of bis(2-hydroxy-3-α-methylcyclohexyl-5-methyl) - methane and 72 parts of an ethylene oxide condensate (9.5 moles) of nonyl-phenol, all parts by weight.

The above peroxide decomposers are particularly effective when the phenolic antioxidant contains two or more hydroxyphenyl groups connected by an alkylene bridge, e.g. as in bis(2-hydroxy-3-α-methylcyclohexyl-5-methylphenyl)methane, or by a sulphur bridge as in bis(3-methyl-6-tert.butylphenol)-4,4'-sulphide.

The following examples illustrate but do not limit our invention.

Example 1

Commercially optically brightened poly(ethylene terephthalate) taffeta fabric (opticle brightener not known) was padded with a 5% aqueous dispersion of a copolymer prepared from dimethyl terephthalate, ethylene glycol, and polyethylene glycol according to Example 11 in U.S. Patent No. 3,416,952. Before padding 0.5% by weight of bis-(2-hydroxy-3-α-methylcyclohexyl - 5 - methylphenyl)-methane and 0.5% by weight based on the weight of copolymer of a thiophosphate or thiophosphite each as a 60% solution in an ethylene oxide condensate of nonylphenol was added to the aqueous dispersion with vigorous agitation. The padded fabric, containing 3% by weight of the copolymer, was heated at 200° C. for 5 minutes in a laboratory air-oven, and then machine washed under normal domestic conditions. Fabric treated with the dispersions containing the thiophosphite or a thiophosphate was whiter than the control fabric treated with a dispersion containing only the hindered phenol.

| Additive with the hindered phenol: | Whitness of washed fabric MgO=100 |
|---|---|
| None | 108.4 |
| Zinc diethyldithiophosphate | 115.5 |
| Zinc dinonyldithiophosphate | 113.0 |
| Trilauryl trithiophosphite | 111.3 |
| Untreated fabric | 114.7 |
| Baked untreated fabric | 109.1 |

The whiteness (W) of the fabric was calculated using the equation $$W = B - 0.75G + 75$$

where B=total reflectance and fluorescence at 440 m$\mu$ and G=reflectance at 500 m$\mu$, measured by a recording spectrophotometer fitted with a xenon lamp and filter to simulate sunlight. Magnesium oxide was used as the comparison standard.

Example 11 of U.S. Patent 3,416,952 illustrates the preparation of and treatment with a crystallisable compound containing an active group which is a water solvatable polyoxyethylene group derived from poly (oxyethylene) glycol of average molecular weight 1540.

Dimethyl terephthalate (194 parts), ethylene glycol of average molecular weight 1540 (440 parts), 2,6-di-tert-butyl-4-methylphenol (0.44 part), calcium acetate (0.1512 part) and antimony trioxide (0.0388 part) were heated from 194° C. to 234° C. over a period of 4½ hours during which time 57 parts of methanol were removed by distillation. Phosphorous acid (0.141 part of a 24.8% solution in ethylene glycol) was added and the molten material was transferred to a polymerisation tube and heated to 282° C. After the excess of glycol had been blown off in a rapid stream of nitrogen the pressure was reduced to 0.1 mm. of mercury and polymerisation was continued for 15 min. The resultant product (viscosity ratio 1.21 as measured on a 1% solution in orthochlorophenol at 25° C.) softened at 40–50° C. and melted (as shown by final loss of crystallinity) at 198–200° C. The product was melted at 200° C. and dropped into water with vigorous agitation to give a 10% w./v. dispersion.

Example 2

A "Terylene"/cotton blend of fabric was padded (100% expression) with a 5% dispersion of the copolymer used in the previous example but to which was added 1.5% by weight, based on the weight of the copolymer dispersion, of the optical brightener. Uvitex EBF (Reg. Trademark of Ciba) as well as bis-(2-hydroxy-3-α-methylcyclohexyl-5-methylphenyl)-methane and zinc di-isopropyldithiophosphate (each 0.5% by weight based on the weight of copolymer solids). Similar fabric was also treated with the copolymer dispersion but which contained only the optical brightener and the hindered phenol antioxidant. The fabrics were heated at 180° C. for 30 seconds on a stenter and then scoured once. The fabric treated with the copolymer dispersion containing the zinc salt was decidedly whiter than the fabric treated with the copolymer not containing the zinc salt.

Example 3

Poly(oxyethylene) glycol (5 g.) having an average molecular weight of 1540 was heated at 197° C. for 15 minutes or 60 minutes whilst oxygen was bubbled through the melt at a rate of 200 ml. per minute. The reaction mixture was cooled rapidly, dissolved in water (40 ml.), and 4 N sulphuric acid (10 ml.) followed by potassium iodide (1 g.) were added. The liberated iodine was titrated with 0.1 N sodium thiosulphate using sodium starch glycollate as indicator. The experiment was repeated but with the addition of various antioxidants. The results, given in the table below, clearly show that the addition of zinc di-isopropyldithiophosphate reduces the peroxide concentration.

| | Titre of sodium thiosulphate (ml.) | | |
|---|---|---|---|
| Antioxidant | 0 min. | 15 mins. at 197° C. | 60 mins. at 197° C. |
| (A) None | <0.02 | 0.43 | 0.53 |
| (B) bis(2-hydroxy-3-α-methyl-cyclohexyl-5-methylphenyl)-methane (0.025 g.) | <0.02 | 0.16 | 1.06 |
| (C) B plus zinc di-isopropyl-dithiophosphate (each 0.025 g.) | <0.02 | <0.02 | <0.02 |
| (D) B (0.050 g.) | <0.02 | <0.02 | 0.54 |

Example 4

Example 1 was repeated except that the dispersion was stabilised with 0.5% by weight, based on the weight of copolymer, of bis(2-hydroxy - 3 - α-methylcyclohexyl-5-methphenyl)-methane and 0.5% by weight of zinc iso-propylxanthate. The whiteness of the once washed treated fabric was superior to that of similar fabric treated with dispersion stabilised only with the hindered phenol antioxidant.

What we claim is:
1. A process for producing a modified shaped synthetic fiber-forming polyester article having crystalline polyester segments comprising padding on to the article a dispersion or solution of a copolymer containing repeat units identical with those constituting the crystalline segments of the polyester article and also polyoxyalkylene segments which confer hydrophilic properties on the article and heating said shaped article to a temperature above 90° C., said solution or dispersion also containing 0.05 to 5% by weight based on the weight of said copolymer of a hindered phenol antioxidant together with 0.005 to 5%, also based on the weight of the copolymer, of a peroxide decomposer selected from the group consisting of a thiophosphate, thiophosphite and a xanthate.

2. A process according to claim 1 in which an aqueous dispersion of said copolymer is used and the phenolic antioxidant and the peroxide decomposer are dissolved in a solvent, prior to dispersing in the aqueous dispersion.

3. A process according to claim 2 in which the solvent used is an ethylene oxide condensate of 6–12 moles of ethylene oxide with 1 mole of nonylphenol.

4. A process according to claim 1 in which the weight of the hindered phenol antioxidant is 0.2 to 1% and the weight of the peroxide decomposer is 0.1 to 1%.

5. A process according to claim 1 in which the peroxide decomposer is a thiophosphate having the formula

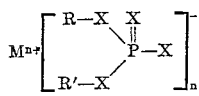

where R and R' are each selected from the group consisting of alkyl radicals, having 2–20 carbon atoms, aryl, aralkyl, and cycloalkyl radicals, X is selected from the group consisting of oxygen and sulphur, at least one X being sulphur, M is a metal ion of valency $n$, selected from the class consisting of Group I and Group II of the Periodic Table, chromium, manganese, iron, cobalt and nickel.

6. A process according to claim 1 in which the peroxide decomposer is a thiophosphate of the formula

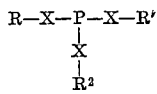

where R, R' and R² are each selected from the group consisting of alkyl radicals having 2–20 carbon atoms, aryl, aralkyl, and cycloalkyl, X is selected from the group consisting of oxygen and sulphur, at least one X being sulphur.

7. A process according to claim 1 in which the peroxide decomposer is a xanthate having the formula

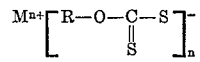

where R is selected from the group consisting of an alkyl, aryl and a cycloalkyl radical, M is a metal ion of valency $n$.

8. A process according to claim 1 in which the phenolic antioxidant contains at least two hydroxyphenyl groups connected by a member of the group consisting of an alkylene bridge and a sulphide bridge.

9. A process according to claim 1 in which the phenolic antioxidant is at least one member of the group consisting of bis(2-hydroxy-3-α-methylcyclohexyl-5-methylphenyl) - methane, and bis(3-methyl-6-tert.butylphenol)-4,4'-sulphide.

10. A process according to claim 1 in which the antioxidant composition consists of 24 parts of zinc di-isopropyldithiophosphate dissolved in 16 parts of dimethylsulphoxide to which is then added 24 parts of bis(2-hydroxy-3-α-methylcyclohexyl-5-methylphenyl)-methane and 72 parts of an ethylene oxide condensate, all parts being by weight.

11. A process according to claim 6 in which the thiophosphite is tridodecyl trithiophosphite.

References Cited
UNITED STATES PATENTS

| | | | |
|---|---|---|---|
| 3,039,993 | 6/1962 | Friedman | 260—45.95 X |
| 3,053,795 | 9/1962 | Coover et al. | 260—45.7 X |
| 3,145,177 | 8/1964 | Orloff et al. | 260—45.95 X |
| 3,206,431 | 9/1965 | Doyle et al. | 260—45.95 X |
| 3,240,752 | 3/1966 | Tamblyn | 260—45.95 |
| 3,284,232 | 11/1966 | Caldwell | 117—138.8 |
| 3,309,222 | 4/1967 | Caldwell | 117—138.8 |

WILLIAM D. MARTIN, Primary Examiner
THEODORE G. DAVIS, Assistant Examiner

U.S. Cl. X.R.
117—139, 161